United States Patent
Abreu et al.

(10) Patent No.: US 12,225,554 B1
(45) Date of Patent: Feb. 11, 2025

(54) SIDELINK FEEDBACK INFORMATION

(71) Applicant: Nokia Technologies Oy, Espoo (FI)

(72) Inventors: Renato Barbosa Abreu, Aalborg (DK); Jian Guo Liu, Shanghai (CN); Yong Liu, Shanghai (CN); Thomas Haaning Jacobsen, Aalborg (DK); Nuno Manuel Kiilerich Pratas, Aalborg (DK); Torsten Wildschek, Gloucester (GB); Akshay Jaiswal, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/777,889

(22) Filed: Jul. 19, 2024

(30) Foreign Application Priority Data

Aug. 10, 2023 (WO) ................ PCT/CN2023/112402

(51) Int. Cl.
*H04W 72/25* (2023.01)
*H04W 74/0808* (2024.01)

(52) U.S. Cl.
CPC ....... *H04W 72/25* (2023.01); *H04W 74/0808* (2013.01)

(58) Field of Classification Search
CPC . H04W 72/20; H04W 72/25; H04W 74/0808; H04W 74/0816–0825
See application file for complete search history.

(56) References Cited

U.S. PATENT DOCUMENTS

| | | |
|---|---|---|
| 2022/0030551 A1 | 1/2022 | Wang et al. |
| 2022/0248414 A1* | 8/2022 | Deng ..................... H04W 4/08 |
| 2023/0084917 A1 | 3/2023 | Li et al. |
| 2023/0188296 A1* | 6/2023 | Fouad ..................... H04L 1/189 370/329 |
| 2024/0098791 A1* | 3/2024 | Cheng ..................... H04W 76/28 |
| 2024/0172254 A1* | 5/2024 | Yang ..................... H04L 1/1812 |
| 2024/0260057 A1* | 8/2024 | Liu ..................... H04W 72/25 |
| 2024/0314822 A1* | 9/2024 | Guo ..................... H04W 72/541 |

FOREIGN PATENT DOCUMENTS

WO 2021/081935 A1 5/2021

OTHER PUBLICATIONS

"WID revision: NR sidelink evolution", 3GPP TSG RAN Meeting #99, RP-230077, Agenda: 9.3.1.5, Oppo, Mar. 20-23, 2023, 6 pages.
"5 GHz RLAN; Harmonised Standard covering the essential requirements of article 3.2 of Directive 2014/53/EU", ETSI EN 301 893, V2.1.1, May 2017, pp. 1-122.
"IEEE 802.11", Wikipedia, Retrieved on Jul. 31, 2024, Webpage available at : https://en.wikipedia.org/wiki/IEEE_802.11.

(Continued)

*Primary Examiner* — Thomas R Cairns
(74) *Attorney, Agent, or Firm* — Nokia Technologies Oy

(57) ABSTRACT

Example embodiments of the present disclosure relate to a solution of transmitting sidelink (SL) feedback information on non-contiguous resource sets. In this solution, in accordance with a determination that a plurality of feedback transmission occasions for sidelink transmissions are mapped on non-contiguous resource sets, an apparatus determines a group of contiguous resource sets mapped with a subset of the plurality of feedback transmission occasions; and transmits feedback information on the group of contiguous resource sets.

20 Claims, 11 Drawing Sheets

(56) References Cited

OTHER PUBLICATIONS

"3rd Generation Partnership Project; Technical Specification Group Radio Access Network; Physical layer procedures for shared spectrum channel access (Release 17)", 3GPP TS 37.213, V17.5.0, Mar. 2023, pp. 1-39.

"LS on PSFCH and S-SSB transmissions over non-contiguous RB sets", 3GPP TSG RAN WG1 Meeting #112bis-e, R1-2304218, RAN1, Apr. 17-26, 2023, 1 page.

"3rd Generation Partnership Project; Technical Specification Group Radio Access Network; NR; Physical layer procedures for control (Release 17)", 3GPP TS 38.213, V17.5.0, Mar. 2023, pp. 1-262.

"3rd Generation Partnership Project; Technical Specification Group Radio Access Network; NR; Physical layer procedures for data (Release 17)", 3GPP TS 38.214, V17.5.0, Mar. 2023, pp. 1-231.

"3rd Generation Partnership Project; Technical Specification Group Radio Access Network; NR; Radio Resource Control (RRC) protocol specification (Release 17)", 3GPP TS 38.331, V17.4.0, Mar. 2023, pp. 1-1324.

"3rd Generation Partnership Project; Technical Specification Group Radio Access Network; NR; User Equipment (UE) radio transmission and reception; Part 1: Range 1 Standalone (Release 18)", 3GPP TS 38.101-1, V18.1.0, Mar. 2023, 802 pages.

"Discussion on physical channel design of sidelink on unlicensed spectrum", 3GPP TSG RAN WG1 #112b-e, R1-2302602, Agenda: 9.4.1.2, Spreadtrum Communications, Apr. 17-26, 2023, 9 pages.

"Physical channel design for sidelink operation over unlicensed spectrum", 3GPP TSG-RAN WG1 Meeting #112bis-e, R1-2302354, Agenda: 9.4.1.2, Huawei, Apr. 17-26, 2023, 38 pages.

"Physical channel design for sidelink operation over unlicensed spectrum", 3GPP TSG-RAN WG1 Meeting #113, R1-2304662, Agenda: 9.4.1.2, Huawei, May 22-26, 2023, 39 pages.

"Reply LS on PSFCH and S-SSB transmissions over non-contiguous RB sets", 3GPP TSG-RAN WG4 Meeting # 107, R4-2310306, RAN4, May 22-26, 2023, 2 pages.

International Search Report and Written Opinion received for corresponding Patent Cooperation Treaty Application No. PCT/CN2023/112402, dated May 6, 2024, 7 pages.

"Sidelink Resource Allocation for Power Saving", 3GPP TSG RAN WG1 #106-e , R1-2107760, Agenda: 8.11.1.1, Apple, Aug. 16-27, 2021, 12 pages.

* cited by examiner

SIDELINK FEEDBACK INFORMATION

FIELDS

Various example embodiments of the present disclosure generally relate to the field of telecommunication and in particular, to methods, devices, apparatuses and computer readable storage medium for transmitting sidelink (SL) feedback information.

BACKGROUND

Wireless communication networks are widely deployed and can support various types of service applications for terminal devices. Many communication schemes have been proposed to support the rapidly increasing data traffic. For example, a sidelink (SL) communication scheme has been proposed, where SL channels may be established between terminal devices in the wireless communication network and the terminal devices may exchange signalling and data with each other directly via the established SL channels. Sidelink communication may be understood as direct device-to-device communication as proposed for example in specifications for cellular communication.

In the scenario where the SL communication is performed in licensed spectrum, the devices transmit SL control information associated with SL data on a physical sidelink control channel (PSCCH), and transmit the SL data on a physical sidelink shared channel (PSSCH) based on the SL control information. Further, in order to ensure the reliability of the SL transmission, it is specified that the physical sidelink feedback channel (PSFCH) is used to carry hybrid automatic repeat request (HARQ) feedback information from the receiving device to the transmitting device or to carry a conflict indication for an inter-UE coordination (IUC) scheme.

SUMMARY

In a first aspect of the present disclosure, there is provided an apparatus. The apparatus comprises at least one processor; and at least one memory storing instructions that, when executed by the at least one processor, cause the apparatus at least to: determine a group of contiguous resource sets mapped with a subset of a plurality of feedback transmission occasions for sidelink transmissions; and transmit feedback information on the group of contiguous resource sets.

In a second aspect of the present disclosure, there is provided a method. The method comprises: determining a group of contiguous resource sets mapped with a subset of a plurality of feedback transmission occasions for sidelink transmissions; and transmitting feedback information on the group of contiguous resource sets.

In a third aspect of the present disclosure, there is provided an apparatus. The apparatus comprises means for determining a group of contiguous resource sets mapped with a subset of a plurality of feedback transmission occasions for sidelink transmissions; and means for transmitting feedback information on the group of contiguous resource sets.

In a fourth aspect of the present disclosure, there is provided a computer readable medium. The computer readable medium comprises instructions stored thereon for causing an apparatus to perform at least the method according to the second aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1A:
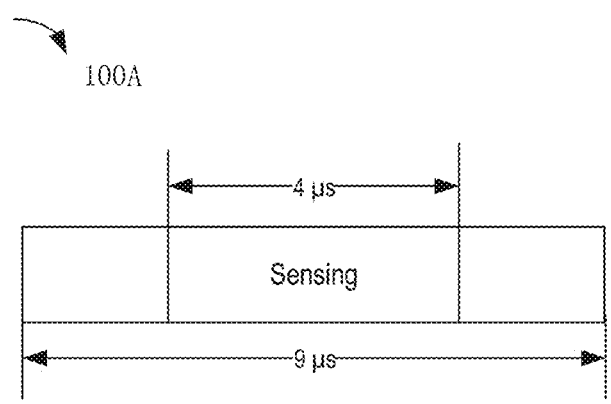
FIG. 1A illustrates Clear Channel Assessment (CCA) slot with duration $T_{sl}$=9 us.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory (ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

For New Radio (NR) sidelink evolution in Release 18 (Rel-18), sidelink in unlicensed spectrum (SL-U) is supported. In sub-7 GHz unlicensed bands, coexistence of a NR system with other systems, such as Electrical and Electronics Engineers (IEEE) 802.11 systems is ensured via a Listen Before Talking (LBT) channel access mechanism. With this mechanism, a user equipment (UE) intending to perform a sidelink (SL) transmission needs first to successfully complete an LBT check, before being able to initiate that transmission. LBT can also be referred as Clear Channel Assessment (CCA) or a channel access procedure.

If a UE passes an LBT check, it needs to observe the channel as available for a number of consecutive CCA slots. In sub-7 GHZ, the duration of these slots is 9 us as illustrated in FIG. 1A, which illustrates Clear Channel Assessment (CCA) slot 100A with duration $T_{sl}=9$ us. In FIG. 1A, the energy detection takes place during 4 us. The UE deems the channel as available in a CCA slot if the measured power (i.e., the collected energy during the CCA slot) is below a regulatory specified energy detection threshold (EDT), which may depend on the transmit power, operating band and geographical region.

Figure 1B:
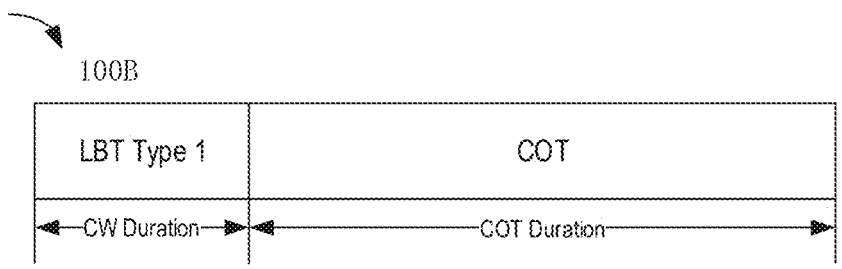
FIG. 1B illustrates a procedure of acquisition of the Channel Occupancy Time (COT) by an initiating device via LBT Type 1.

When a UE initiates the communication (i.e., the UE takes the role of an initiating device), this UE has to acquire the "right" to access the channel for a certain period of time-denoted in the regulations as the Channel Occupancy Time (COT). The COT may be acquired by applying an "extended" LBT procedure which is commonly known as LBT Type 1 as specified in the 3rd Generation Partnership Project (3GPP) standards such as 3GPP TS 37.213. The "extended" LBT procedure is performed in a Contention Window (CW), and the channel is deemed as free for the entire duration of the CW. FIG. 1B illustrates a procedure 100B of acquisition of the Channel Occupancy Time (COT) by an initiating device via LBT Type 1.

The duration of both the COT and CW depends on the Channel Access Priority Class (CAPC) associated with the UE's traffic. Table 1 shows CAPC for UL as below.

TABLE 1

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |

TABLE 1-continued

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot,p}$ = 10 ms if the higher layer parameter absenceOfAnyOtherTechnology-r14 or absenceOfAnyOtherTechnology-r16 is provided, otherwise, $T_{ulm\ cot,p}$ = 6 ms.
NOTE 2:
When $T_{ulm\ cot,p}$ = 6 ms it may be increased to 8 ms by inserting one or more gaps. The minimum duration of a gap shall be 100 us. The maximum duration before including any such gap shall be 6 ms.

In some cases, a similar table defining the parameter associated to a CAPC of value p may be used for SL communication in unlicensed spectrum. As shown in Table 1, the contention window length in CCA slots associated with each CAPC has a minimum ($CW_{min,p}$) and maximum ($CW_{max,p}$). The duration of the COT is given by $T_{ulm\ cot,p}$. It is to be noted that although the LBT Type 1 details for the Uu uplink (UL) case is shown in Table 1, the downlink (DL) case LBT Type 1 parameters could also in principle be adopted in SL.

Figure 2:
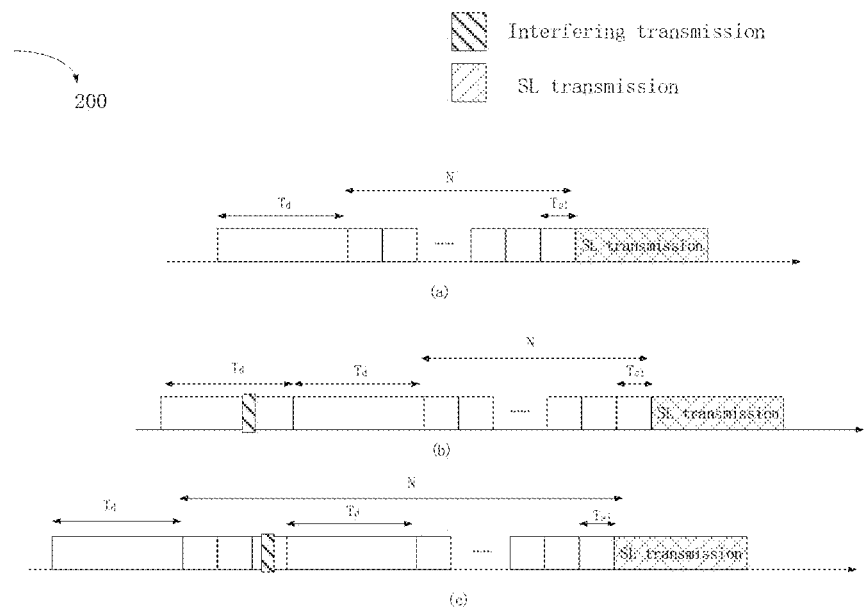
FIG. 2 illustrates LBT Type 1 contention window countdown procedure.

FIG. 2 illustrates LBT Type 1 contention window countdown procedure 200 and examples on how it can be disrupted. During the contention window countdown procedure, if the LBT check fails in any CCA slot, then the countdown will stop and will only resume if the channel is deemed as free (i.e., the LBT check is successful) during a defer time. The following may happen during the LBT Type 1 procedure: (a) neither the defer time nor the countdown are disrupted (i.e. the channel is not detected as busy during a sensing slot); (b) the defer time is disrupted (i.e. the channel is detected as busy during a defer time sensing slot); and (c) the contention window count down is disrupted (i.e. the channel is detected as busy during a sensing slot of the count down).

Figure 3:
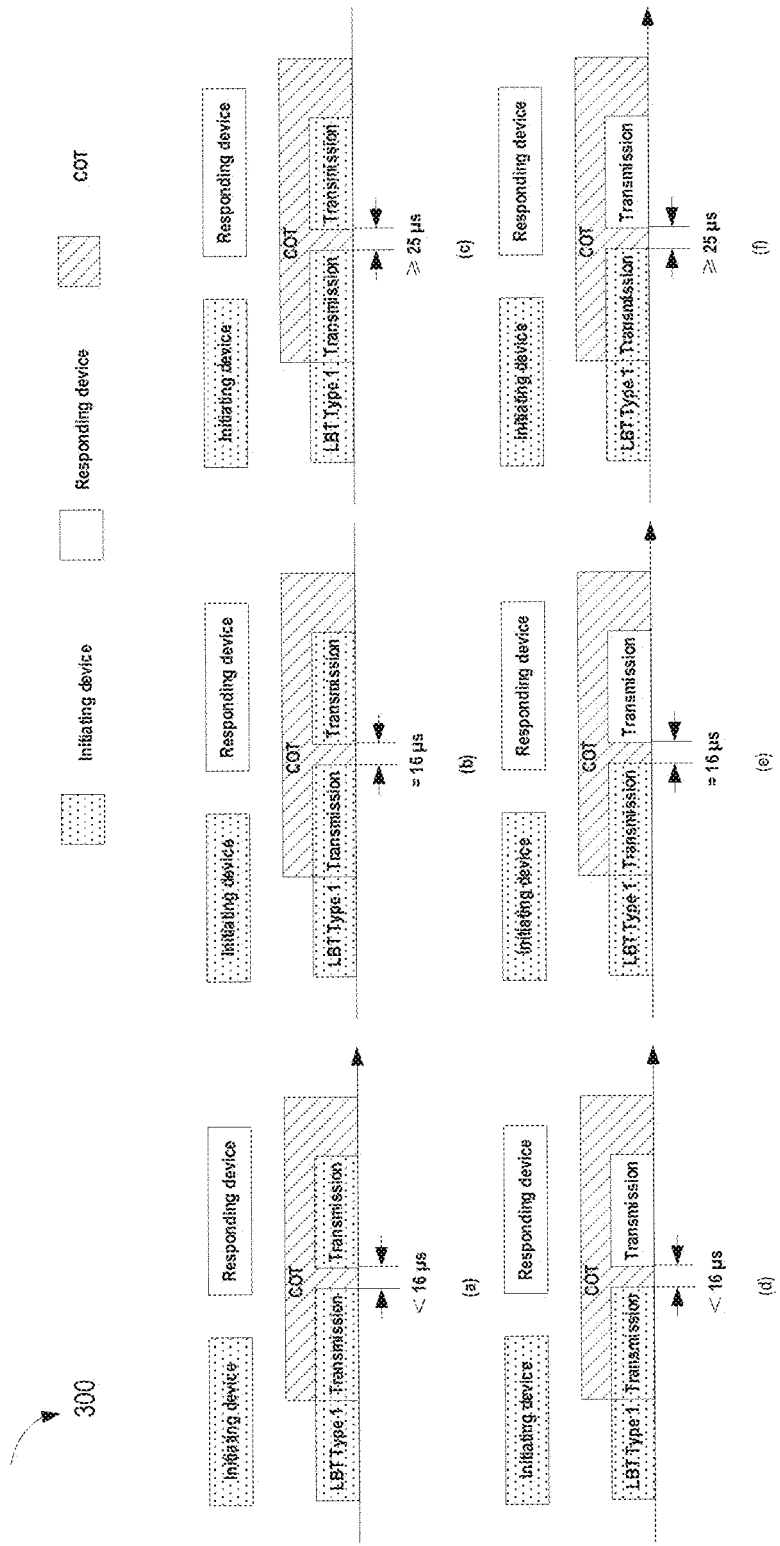
FIG. 3 illustrates the allowed gaps for which Listen Before Talking (LBT) Type 2 variant to be applicable.

Upon successfully completing the LBT Type 1 and performing a transmission, the UE initiating the transmission (e.g., the initiating device) acquires the COT with duration associated with the corresponding CAPC. The acquired COT is valid even in the case where the initiating device pauses its transmission. However, if the initiating device wants to perform a new transmission (within the COT) it is still required to perform a "reduced" LBT procedure which is commonly known as LBT Type 2, for example, as specified in 3GPP TS 37.213, with the following variants:

LBT Type 2 has the following variants: Type 2A (25 μs LBT)—for SL transmissions within the initiating device acquired COT (in case the gap between two SL transmissions is ≥25 μs, as well for SL transmissions following another SL transmission from another device such as a responding device); depicted in FIG. 3 (c) and (f);

Type 2B (16 μs LBT)—for SL transmissions within the initiating device acquired COT (which can also be used for SL transmissions following another SL with gap equal to 16 μs); depicted in FIG. 3 (b) and (e);

Type 2C (no LBT)—which can be used for SL transmissions within the initiating device acquired COT and for SL transmission following another SL transmission from another device such as a responding device, with a gap<16 μs and the allowed duration of the SL transmission≤584 μs; depicted in FIG. 3 (a) and (d).

FIG. 3 illustration of the allowed gaps 300 for which LBT Type 2 variant to be applicable: (a) and (d) LBT Type 2C; (b) and (e) LBT Type 2B; (c) and (f) LBT Type 2A. (a), (b). and (c) shows the case where the gap is between the two transmissions both from the initiating UE, while (d), (e), and (f) show the case that the gap is between the two different transmissions from the initiating UE and the responding UE correspondingly).

The initiating device can share its acquired COT with its intended receiver (the responding device). For this purpose, the initiating device may inform (e.g., via control signaling) the responding device about the duration of this COT. The responding device then uses this information to decide which type of LBT it is to apply upon performing a transmission for which the intended receiver is the initiating device. In case the responding device transmission falls outside the COT, then the responding device will acquire a new COT using LBT Type 1 with the appropriate CAPC.

In NR in unlicensed spectrum (NR-U), a multi-channel access procedure was supported to allow a wider transmission bandwidth and improve a data rate (also known as transmissions in multiple resource block (RB) sets, where each RB set contain the RBs corresponding to a channel which the UE may need to perform LBT for transmitting). In NR-U, the multi-channel access procedure comprises Type A and Type B multi-channel access procedures for dynamic channel access. In the Type A multi-channel access procedure, the gNB performs a backoff procedure on each channel in parallel. When the backoff counter on a given channel reaches zero, the gNB starts a transmission on the channel. The transmissions may start on multiple channels if the corresponding backoff counters reach zero simultaneously. In the Type B multi-channel access procedure, the gNB selects a single primary channel on which it performs a backoff procedure. When the backoff procedure completes, the gNB starts transmissions on the primary channel and on the other channels that have been sensed idle for Tmc before the backoff finishes.

In NR-U, independent channel access procedure over each channel is supported for semi-static channel access mode (similar to the spirit of Type A multi-channel access procedure).

As for sidelink on unlicensed spectrum for both mode 1 and mode 2, channel access mechanisms from NR-U shall be reused for sidelink unlicensed operation. Specifically, assess the applicability of sidelink resource reservation from Rel-16/Rel-17 to sidelink unlicensed operation within the boundaries of unlicensed channel access mechanism and operation.

Further, as for physical channel design framework, it is required changes to NR sidelink physical channel structures and procedures to operate on unlicensed spectrum, and the existing NR sidelink and NR-U channel structure shall be reused as the baseline.

In sidelink unlicensed operation, the gNB does not perform Type 1 channel access to initiate and share a channel occupancy, neither Type 2 channel access to share an initiated channel occupancy, nor semi-static channel access procedures to access an unlicensed channel.

In Rel-16 (the work item "5G V2X with NR sidelink"), PSFCH for sidelink communication was specified to carry Hybrid Automatic Repeat reQuest (HARQ) feedback over the sidelink (at physical layer) from a UE which is an intended recipient of a PSSCH transmission (henceforth an Rx UE) to the UE which performed the transmission (henceforth a Tx UE). A UE may be indicated by a sidelink control information (SCI) format scheduling a PSSCH reception to transmit a PSFCH with HARQ-ACK information in response to the PSSCH reception. The UE provides HARQ-ACK information that includes ACK or NACK, or only NACK.

Figure 4:
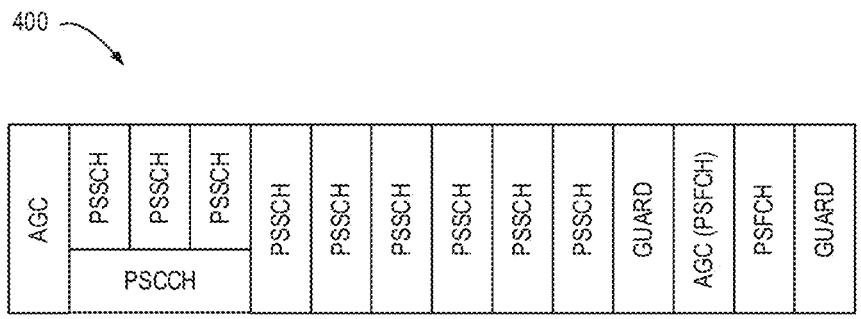
FIG. 4 illustrates an example frame structure of a sidelink slot with PSFCH.

FIG. 4 illustrates a frame structure 400 of a sidelink slot with PSFCH. The PSFCH transmits a sequence in one PRB repeated over two OFDM symbols, the first of which can be used for AGC, near the end of the sidelink resource in a slot. An example of slot format of PSCCH, PSSCH, and PSFCH is provided in the following figure. The sequence as base sequence is (pre-) configured per sidelink resource pool.

The time resources for PSFCH are (pre-) configured to occur once in every 1, 2, or 4 slots. HARQ feedback is disabled if periodicity is set to 0 (refer to SL-PSFCH-Config in TS 38.331). The HARQ feedback resource (PSFCH) is derived from the resource location of PSCCH/PSSCH.

For PSSCH-to-HARQ timing, the gNB configures a parameter K with the unit of slot. The time occasion for PSFCH is determined from K. For a PSSCH transmission with its last symbol in slot n, HARQ feedback is in slot n+a where a is the smallest integer larger than or equal to K with the condition that slot n+a contains PSFCH resources. As an example illustrated in FIG. 5 (which illustrates a mapping 500 between PSSCHs and PSFCHs), the period of PSFCH resources is configured as 2, and K is configured as 2.

Figure 5:
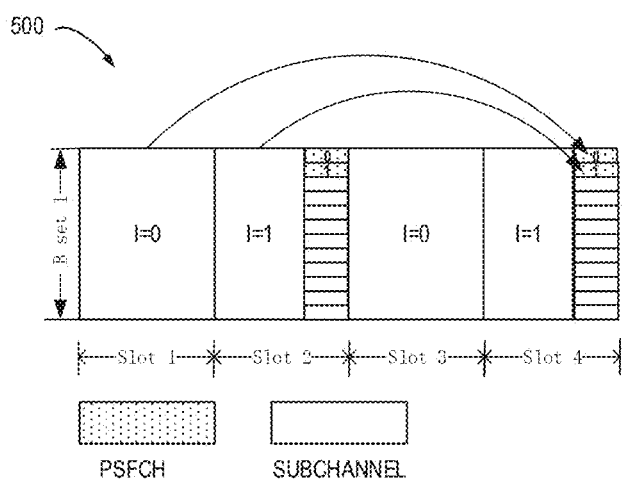
FIG. 5 illustrates an example mapping between PSSCHs and PSFCHs.

For a PSFCH transmission or reception with HARQ-ACK information, a priority value for the PSFCH is equal to the priority value indicated by an SCI format 1-A associated with the PSFCH. In FIG. 5, there is only one subchannel per slot in an RB set. It should be understood that, in some cases, there may be more than one subchannel per slot.

If the PSSCH are from different Tx UEs to a same Rx UE, then the Rx UE may need to transmit multiple PSFCHs in reply to different UEs simultaneously.

In Rel-18 WI for SL-U, wideband operation using multiple resource block (RB) sets for the SL channels and the multi-channel access procedure should be supported. Further, each RB set may be associated with one LBT channel.

For wideband operations, the minimum requirements for the transmitter characteristics are specified for transmissions on one scheduled RB set or ≥1 scheduled contiguous RB set(s) within the UE channel. The requirements apply with configured UL intra-cell guard bands of non-zero size, with the union of the scheduled RB sets and the intra-cell guard bands.

For dynamic channel access mode with multi-channel case in SL-U, the UE may use NR-U DL (Type A or Type B) multi-channel access procedure as the baseline for multiple PSFCH transmissions on multiple channels, where each PSFCH transmission is confined within one LBT channel.

For dynamic channel access mode with multi-channel case in SL-U, both NR-U DL Type A and Type B multi-channel access procedure are supported for multiple PSFCH transmissions on multiple channels.

The scenario where a RX UE needs to transmit PSFCHs (using existing R16/17 PSFCH format 0) across multiple unlicensed channels within a SL BWP in a same slot has been discussed. Further, UE transmitting Sidelink Synchronization Signal Blocks (S-SSBs) across multiple unlicensed channels within a SL BWP in a same slot also has been discussed.

It is still pending about whether multiple PSFCHs (using existing R16/17 PSFCH format 0) can be transmitted over non-contiguous RB sets, and whether there is a limitation(s) on e.g., number of RB sets, maximum frequency separation between the RB sets if multiple PSFCHs (using existing R16/17 PSFCH format 0) can be transmitted over non-contiguous RB sets. Note that, according to existing RAN1 agreements, it is not possible to transmit PSFCH and S-SSB within an SL Bandwidth part (BWP) in a same slot. Thus, it is also pending about whether multiple S-SSBs can be transmitted over non-contiguous RB sets, and whether there is a limitation(s) on e.g., number of RB sets, maximum frequency separation between the RB sets if multiple S-SSBs can be transmitted over non-contiguous RB sets.

It is noted that when the term "a group of" is used, it may mean one or more elements/items, which may be replaced by terms of "at least one" or "a set of". For example, "a group of Xs" means "at least one X" or "one or more Xs".

In the present discourse, terms "contiguous resources" refers to that all the resources are sequentially connected. For example, if the contiguous resources are mapped on a same slot, then the resources are contiguous in frequency. Further, as for contiguous resource sets, it means that the contiguous resource sets may be contiguous to each other as well at least within one carrier.

Example Environment

Figure 6A:
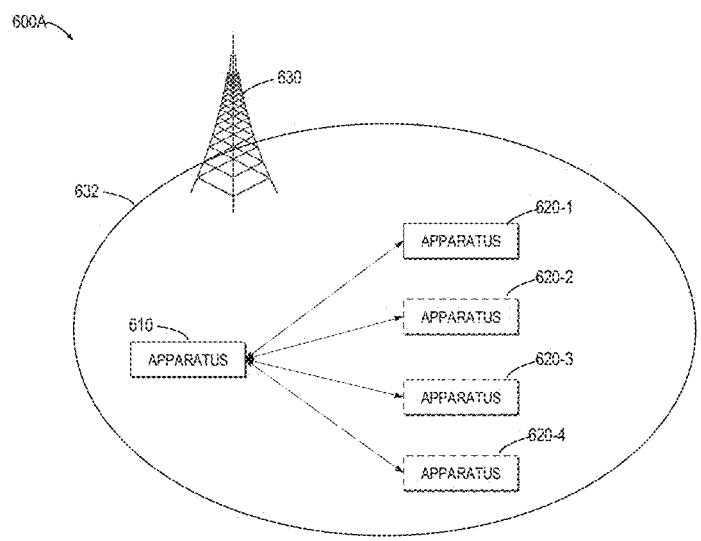
FIG. 6A illustrates an example communication environment in which example embodiments of the present disclosure can be implemented.

FIG. 6A illustrates an example communication environment 600A in which example embodiments of the present disclosure can be implemented.

The communication environment 600A, which may be a part of a communication network, comprises a network apparatus 630, an apparatus 610 and apparatuses 620-1 to 620-4. For purpose of discussion, the apparatuses 620-1 to 620-4 are collectively referred to as apparatuses 620.

Further, the network apparatus 630 may provide one or more cells, for example, a cell 632 is provided by the network apparatus 630, as illustrated in FIG. 6A.

In some example embodiments, the apparatus 610 and the apparatus 620 may be comprised in a terminal device/apparatus. In the following, for the purpose of illustration, some example embodiments are described with the apparatus 610 (or the apparatus 620) operating as a terminal apparatus. If so, a link the network apparatus 630 to the apparatus 610 (or the apparatus 620) is referred to as a downlink (DL), while a link from the apparatus 610 (or the apparatus 620) to the network apparatus 630 is referred to as an uplink (UL). In DL, the network apparatus 630 is a transmitting (TX) device (or a transmitter), and the apparatus 610 (or the apparatus 620) is a receiving (RX) device (or a receiver). In UL, the apparatus 610 (or the apparatus 620) is a TX device (or a transmitter), and the network apparatus 630 is a RX device.

In addition, a link between two apparatuses is referred to as a sidelink (SL). In SL, one of the apparatuses is a TX device (or a transmitter), and the other of the apparatus is a RX device (or a receiver).

It is to be understood that the number of devices and their connections shown in FIG. 6A are only for the purpose of illustration without suggesting any limitation. The communication environment 600A may include any suitable number of terminal devices and network devices configured to implement example embodiments of the present disclosure.

Communications in the communication environment 600A may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Given the lack of definition for non-contiguous RB sets transmission, it is considered that RX UEs may not be able to transmit PSFCH in non-contiguous RB sets, at least when they don't succeed LBT on all RB sets. To transmit in non-contiguous RB sets, in some cases a UE would have to adapt RF filters and/or DSP settings based on the LBT outcome. Such adaptation covers multiple aspects which is dependent on implementation and some UE/Chipset companies were not willing to implement that (based on NR-U discussions). Some front end cannot dynamically tune filters to the RB sets that it will get to transmit. At least it will require that the UE succeeds LBT in all RB sets, even the ones without allocation).

The lack of support for non-contiguous RB sets transmission may be rather problematic for SL communication in unlicensed spectrum.

The RX UE has no control over the resources on which it receives PSSCH with HARQ feedback enabled, from possibly multiple TX UEs; so, it will often happen that the PSFCH resources associated with these PSSCH receptions are mapped to non-contiguous RB sets, and therefore causing an unpredictable behavior on the UEs. Note that an enhanced IUC scheme 1, if supported and (pre) configured in the resource pool, could give the RX UE some influence on the TX UEs' resource selection, but that cannot solve the issue in general as IUC may not be supported by all the UEs. An example of this issue is illustrated in FIG. 6B, which illustrates SL transmissions 600B are mapped to non-contiguous RB sets.

Figure 6B:
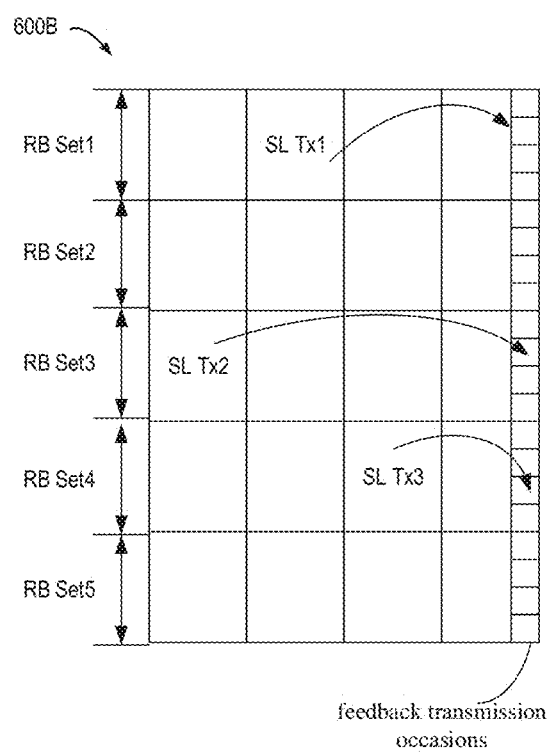
FIG. 6B illustrates an example of SL transmissions with feedback occasions mapped to non-contiguous RB sets.

In FIG. 6B, the five RB sets (i.e., RB sets 1 to 5) are over Multi-channel BWP (such as, 100 MHz). In FIG. 6B, the SL Tx1 is transmitted on RB set 1, the SL Tx2 is transmitted on RB set 3, and the SL Tx3 is transmitted on RB set 4. Further, the SL Tx 1 to SL Tx3 are configured as needing feedback information. As illustrated in FIG. 6B, the feedback information (could be referred to also as sidelink feedback information) is mapped on a plurality of feedback transmission occasions, where the plurality of feedback transmission occasions are mapped on RB set 1, RB set 3 and RB set 4. In FIG. 6B, RB set 2 (and RB set 5) is empty RB set, which causing non-contiguous resource sets.

If an SL transmission is configured as requiring feedback information, the SL transmission may correspond to a SL feedback occasion (or more than one feedback occasion). In other words, one or more feedback occasions may be configured for the SL transmission which requires feedback information.

According to the present disclosure, a set of rules is proposed, where the rules allow the RX UE to prioritize the selection of PSFCH transmission occasions which are mapped into contiguous RB sets (i.e., which are formed by one or more RB sets that are contiguous in the frequency domain, also call as "a group of contiguous resource sets" in the following). Any remaining PSFCH transmission occasions which do not fall into the determined contiguous RB sets will be dropped/deprioritized.

In the specific example of FIG. 6B where a multi-channel BWP includes five RB sets mapped with candidate feedback transmission occasions, a group of contiguous resources sets comprising a subset of the plurality of feedback transmission occasions may be any of the following (according to the different rule(s)):

in case that the number of contiguous resources sets is 1, the group of contiguous resources sets may be: {RB set 1}, {RB set 3}, {RB set 4};

in case that the number of contiguous resources sets is 2, the group of contiguous resources sets may be: {RB set 1, RB set 2}, {RB set 2, RB set 3}, {RB set 3, RB set 4}, {RB set 4, RB set 5};

in case that the number of contiguous resources sets is 3, the group of contiguous resources sets may be: {RB set 1, RB set 2, RB set 3}, {RB set 2, RB set 3, RB set 4}, {RB set 3, RB set 4, RB set 5};

in case that the number of contiguous resources sets is 4, the group of contiguous resources sets may be: {RB set 1, RB set 2, RB set 3, RB set 4}, {RB set 2, RB set 3, RB set 4, RB set 5};

in case that the number of contiguous resources sets is 5, the group of contiguous resources sets may be: {RB set 1, RB set 2, RB set 3, RB set 4, RB set 5}.

It is to be clarified that the above listed the group of contiguous resources sets are given only for illustrative purpose without suggesting any limitations. In other words, the above listed the group of contiguous resources sets aim to list all the possible selection results. When the application scenario changes, such as, the number of resources sets changes, the final selection of the group of contiguous resources sets also may be changed accordingly.

It is to be noted that more than one rule may be implemented and configured to be applied in a certain order, so that it results in a single group of contiguous RB sets where the transmission occasions should be transmitted.

Further, in some example embodiments, the determination according to the rules may be performed prior to the LBT procedure for transmitting in the corresponding RB sets.

Alternatively, in some example embodiments, the determination may be performed after the LBT procedure on each RB set, such that only the RB sets which has successful LBT are considered for the selection. Although it requires faster UE processing, it also reduces the chance of PSFCH dropping present in former option when PSFCH is selected in an RB set which may fail the LBT.

In this way, the feedback information may be transmitted on contiguous resource sets. In other words, the RX UE may obtain a single group of contiguous RB sets where the transmission occasions should be transmitted. The single group of contiguous RB sets is a subset of the non-contiguous RB sets. In FIG. 6B, the non-contiguous RB sets may be {RB set 1, RB set 2, RB set 3, RB set 4, RB set 5}, and the single group may be determined to be any of the above listed group which may be determined based on one or more rules.

Work Principle and Example Signaling for Communication

Figure 7:
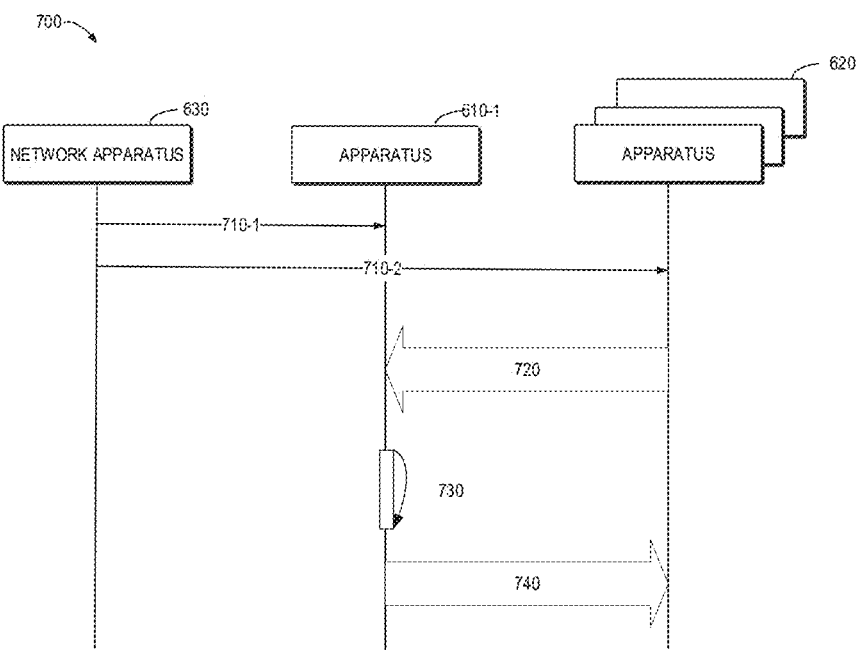
FIG. 7 illustrates a signaling diagram for an example communication process in the communication environment according to some example embodiments of the present disclosure.

Reference is made to FIG. 7, which illustrates a signaling flow 700 of communication in accordance with some embodiments of the present disclosure. For the purposes of discussion, the signaling flow 700 will be discussed with reference to FIGS. 6A and 6B, for example, by using the apparatus 610, the apparatus 620 and the network apparatus 630.

In addition, in the following description, examples of message type (such as SCI, RRC, MAC CE) are only for the purpose of illustration without suggesting any limitations. In other example embodiments, any suitable message types may be used for the interaction between the apparatus 610, the apparatus 620 and the network apparatus 630.

In the example of FIG. 7, the apparatus 610 and the apparatus(es) 620 may be functions as terminal apparatuses. Further, the apparatus 610 may be a sidelink transmission receiver and feedback information transmitter, while the apparatus(es) 620 may be a sidelink transmission transmitter and feedback information receiver.

Further, below discussions on feedback information may be applied by a UE intending to transmit other kind of channels such as S-SSB in multiple RB-sets. Merely for brevity, the same or similar contents are omitted here.

In some example embodiments, the sidelink transmissions may be received on unlicensed resources.

In operation, the apparatus 610 receives 720 sidelink transmissions from the apparatus(es) 620. Then, the apparatus 610 determines if a plurality of feedback transmission occasions for the sidelink transmissions are mapped on non-contiguous resource sets. If it is determined that the plurality of feedback transmission occasions for the sidelink transmissions are mapped on non-contiguous resource sets, the apparatus 610 determines 730 a group of contiguous resource sets mapped with a subset of the plurality of feedback transmission occasions. Next, the apparatus 610 transmits 740 feedback information on the group of contiguous resource sets. Thus, the apparatus 610 may transmit feedback information on the group of contiguous resource which are a subset of the non-contiguous resource sets (e.g., a bigger group of resource sets). Thus, by selecting the subset, the apparatus 610 may make the used resource sets (i.e., the resource sets used for transmitting sidelink feedback information) to be contiguous.

In some example embodiments, the apparatus 610 may prevent transmitting feedback information on one or more feedback transmission occasions which are not mapped on the group of contiguous resource sets.

In some example embodiments, the apparatus 610 may deprioritize transmitting feedback information on one or more feedback transmission occasions which are not mapped on the group of contiguous resource sets.

In some example embodiments, the apparatus 610 may determine the group of contiguous resource sets based on one or more rules associated with at least one of the following:

the amount of feedback information carried on a resource set of the non-contiguous resource sets, priority information of a sidelink transmission associated with feedback information carried on a resource set of the non-contiguous resource sets, priority information of a resource set of the non-contiguous resource sets, a feedback-type of feedback occasion of the plurality of feedback transmission occasions, a cast-type of feedback information carried on a resource set of the non-contiguous resource sets, listen before talk (LBT)-related information on the non-contiguous resource sets, or a receive power strength of a sidelink transmission associated with feedback information carried on a resource set of the non-contiguous resource sets.

In some cases, applying more than one rule is need, that is because applying a single rule may result in more than one group contiguous RB sets which meets the criteria of the rule (e.g., there is more than one group of contiguous RB sets with a same amount of feedback information or with the same associated priority). If so, other rule(s) should be applied until it results in a single group of contiguous RB set.

In some example embodiments, the apparatus 610 may determine, by sequentially applying the one or more rules, the group of contiguous resource sets according to a rule order.

Additionally, in some example embodiments, the rule order may be defined by as a default configuration. As one example, the rule order may be pre-defined by the communication organization (such as 3GPP), or pre-defined by the network operator or service provider. In this way, no additional signaling exchanging is needed.

Alternatively, in some example embodiments, the rule order may be dynamically or semi-statically configured. For example, as illustrated in FIG. 7, the network apparatus 630 may configure the rule order and transmit 710-1 (and 710-2) the rule order to the apparatus 610 (and the apparatus(es) 620).

As an example process, the apparatus 610 may load configuration of rules for determining the group of contiguous resource sets and a rule order for applying the rules. Then the apparatus 610 apply the first rule for determining the group of contiguous resource sets according to the rule order. After applying the first rule, the apparatus 610 determines if it results in a single group of contiguous RB set. If so, the apparatus 610 transmits the feedback information on the determined the single group of contiguous RB set.

If not, the apparatus 610 applies the next rule (i.e., the second rule). After applying the second rule, the apparatus 610 determines if it results in a single group of contiguous RB set. If so, the apparatus 610 transmits the feedback information on the determined the single group of contiguous RB set. If not, the apparatus 610 continue to apply the next rule (i.e., the third rule). In a nutshell, the apparatus 610 repeats this procedure until a single group of contiguous RB set is determined.

In the following, how to apply the rule(s) to determine the group of contiguous resource sets will be detailed with reference to FIG. 8A to FIG. 8I.

In some example embodiments, the apparatus 610 may determine, based on the amount of feedback information, the group of contiguous resource sets so that it maximizes the amount of feedback information transmitted by using contiguous resource sets.

In other words, the apparatus 610 may select the PSFCHs in the contiguous RB sets which maximize the amount of PSFCH to be transmitted (or equivalently minimize number of dropped PSFCH).

Figure 8A:
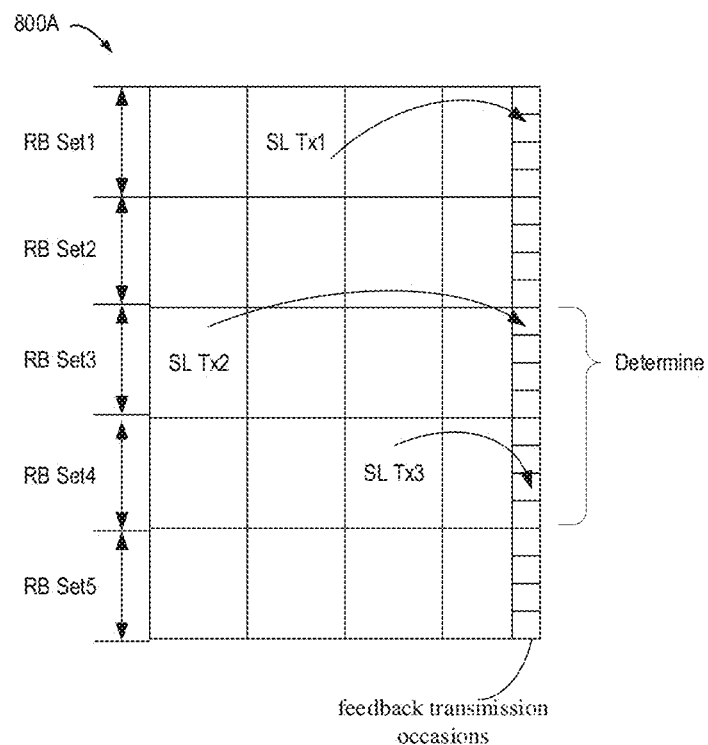
FIGS. 8A to 8I illustrate examples of selections of feedback transmission occasions.

Reference is now made to FIG. 8A. In FIG. 8A, the candidate groups of contiguous resource sets may be {RB set 1} and {RB set 3, RB set 4}. Thus, group of {RB set 3, RB set 4} is determined.

As discussed above, in some example embodiments, the apparatus 610 may determine the groups of contiguous resource sets based on priority information of a sidelink transmission associated with feedback information carried on a resource set of the non-contiguous resource sets.

In some example embodiments, the apparatus 610 may select the PSFCHs in the contiguous RB sets which maximize a function of the priority values associated to the PSFCH mapped on the RB sets. The function may be an average or a weighted average of the priority values. In the example, it is assumed that the higher priority information is associated to a high priority value. In another example, assuming that lower priority values map to higher priority information, the function to maximize may be the number of minimal priority value associated to the PSFCH mapped on the RB sets.

Figure 8B:
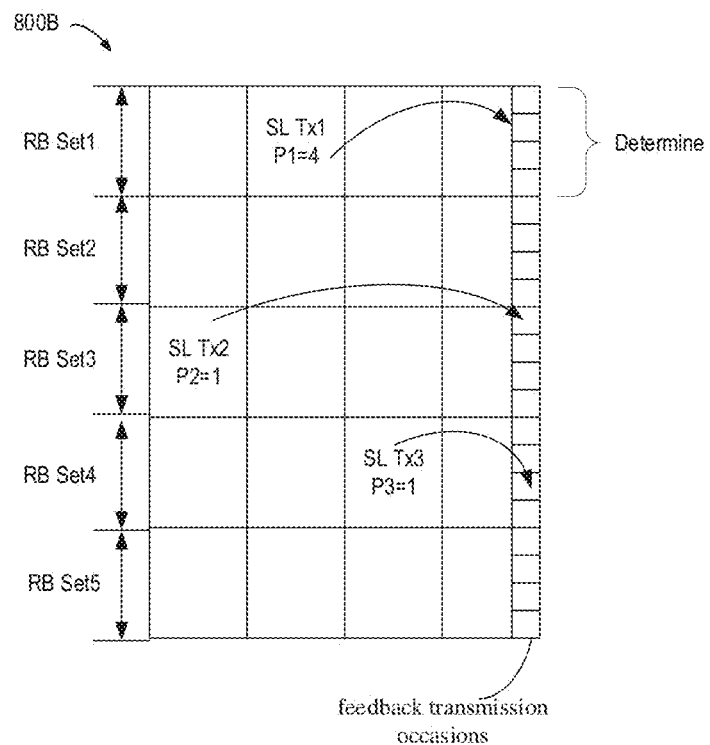

Reference is now made to FIG. 8B. In FIG. 8B, the higher value of the priority corresponds to a higher priority. The candidate groups of contiguous resource sets may be {RB set 1} with a sum priority value=4 and {RB set 3, RB set 4} with a sum priority value=2. Thus, group of {RB set 1} is determined.

As discussed above, in some example embodiments, the apparatus 610 may determine the groups of contiguous resource sets based on priority information of a resource set of the non-contiguous resource sets.

In some example embodiments, the apparatus 610 may select the PSFCHs in the contiguous RB sets following a (pre) configured/predefined order of preferred RB sets (i.e., configured via RRC signaling, or indicated via MAC-CE or SCI, or preconfigured together with resource pool or BWP configuration, or predefined according to specification). For example, the RB sets of lower indexes can be configured as preferred.

Figure 8C:
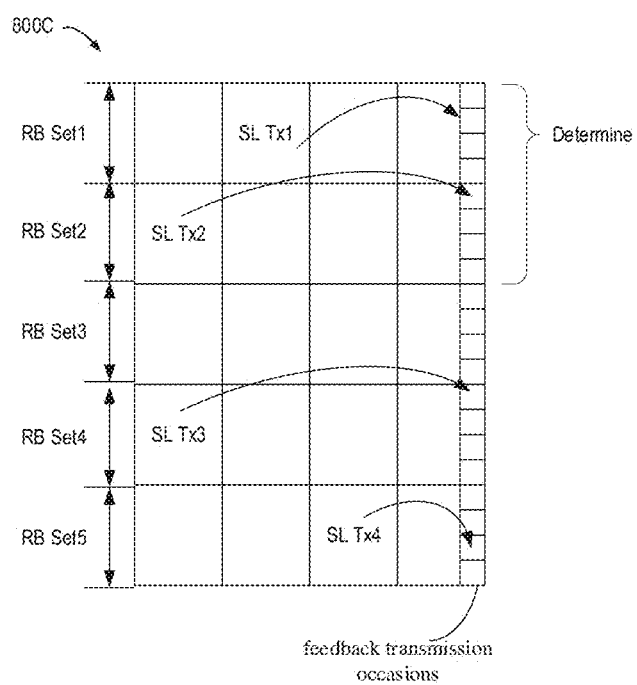

Reference is now made to FIG. 8C. In FIG. 8C, RB set 1 and/or RB set 2 is preferred compared with RB set 4 and/or RB set 5. Thus, group of {RB set 1, RB set 2} is determined.

In some example embodiments, the feedback transmission occasion may be either a primary feedback transmission occasion of feedback information, or a secondary feedback transmission occasion of feedback information.

In some example embodiments, the primary feedback transmission occasion and the secondary feedback transmission occasion (also referred to as "additional feedback transmission occasion") are mapped on two different resource sets in a same slot. In this event, the apparatus 610 may transmit feedback information on a target feedback occasion, wherein the target feedback occasion is the primary feedback transmission occasion or the secondary feedback transmission occasion and wherein the target feedback occasion is mapped on the group of contiguous resource sets.

In some example embodiments, the secondary (or additional) PSFCHs are (pre) configured/indicated in different RB sets and the UE selects between primary or secondary PSFCHs so that the selected PSFCHs are in the N contiguous RB sets.

Figure 8D:
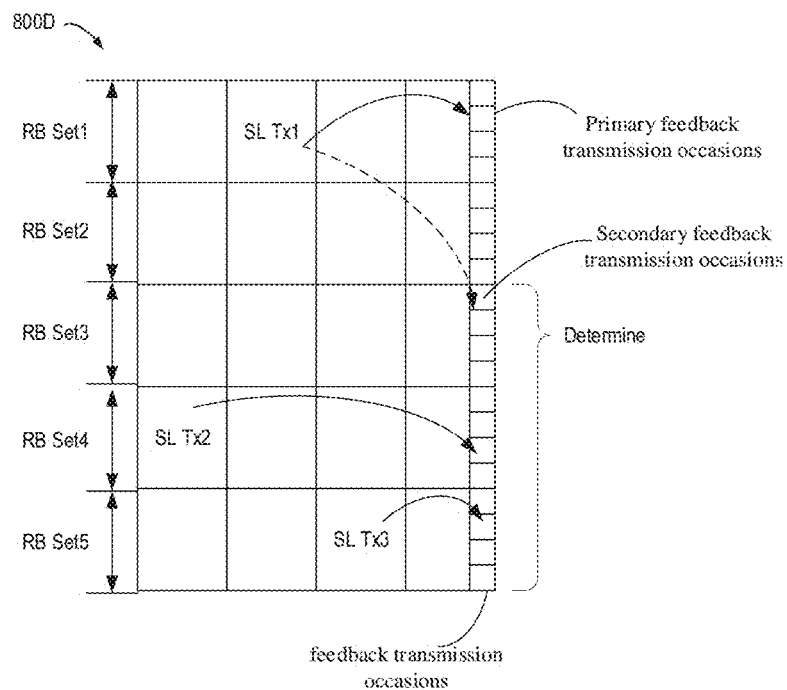

Reference is now made to FIG. 8D. In FIG. 8D, feedback information of SL Tx1 is mapped to a primary feedback transmission occasion and a secondary feedback transmission occasion. The secondary feedback transmission occasion may construct a preferred contiguous resource sets together with RB set 4 and RB set 5. Thus, group of {RB set 3, RB set 4, RB set 5} is determined.

In some example embodiments, the primary feedback transmission occasion and the secondary feedback transmission occasion are mapped on two different slots. In this event, in accordance with a determination of a transmission failure of feedback information on the primary feedback transmission occasion, the apparatus 610 may determine the group of contiguous resource sets to comprise a resource set with the mapping of the secondary feedback transmission occasion.

That is, the apparatus 610 may selects the PSFCHs in the contiguous RB sets which maximize the number of secondary PSFCH to be transmitted (i.e., prioritizing secondary PSFCHs for minimizing the dropping of PSFCH which the HARQ-ACK may have been previously dropped/deprioritized, e.g., due to LBT failure).

Figure 8E:
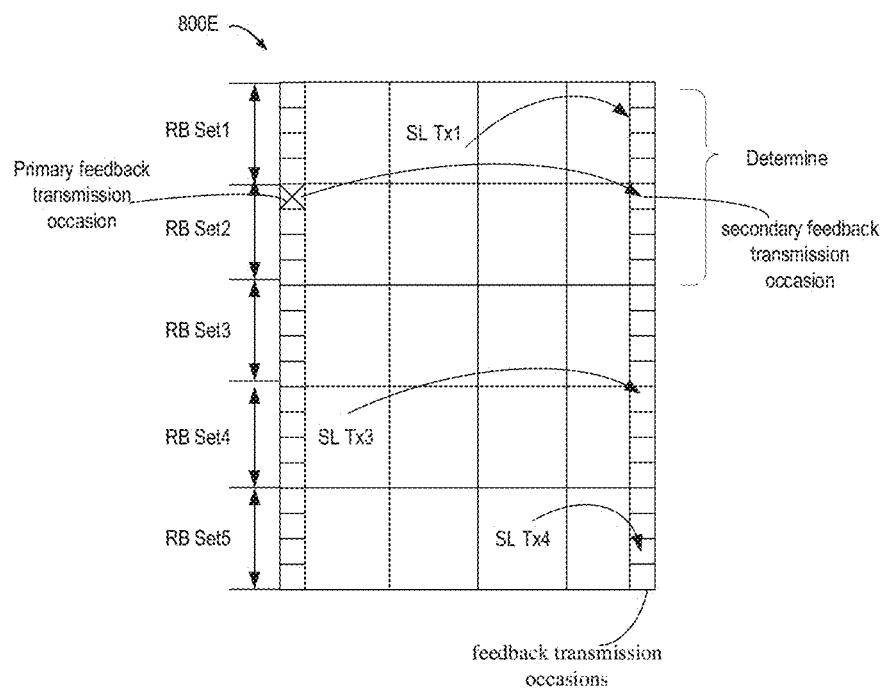

Reference is now made to FIG. 8E. In FIG. 8E, the transmission of feedback information on the primary feedback transmission occasion in RB set 2 is failed, and the secondary feedback transmission occasion is mapped on RB set 2. Thus, group of {RB set 1, RB set 2} is determined.

In some example embodiments, the feedback-type of feedback occasion is an indication for inter-UE coordination (IUC). The apparatus 610 may select the group of contiguous RB sets which includes the IUC indication.

In some example embodiments, the apparatus 610 may determine, based on the LBT-related information, the group of contiguous resource sets which has a lower LBT failure probability.

In some example embodiments, the apparatus 610 may determine an LBT failure probability of the resource set is lower in response to at least one of the following:
the resource set being associated with an initiated channel occupancy time (COT),
the resource set being associated with a Type 2C LBT,
a duration without LBT failure exceeding or equaling to a threshold duration,
the resource set being not used by other radio access technology (RAT).

In some example embodiments, the apparatus 610 may selects the PSFCHs in the contiguous RB sets with lower chance of LBT failure (e.g., the RB sets which have an initiated COT, or the RB sets which where Type 2C LBT can be used, or the RB sets where no consistent LBT failure has been declared in the for a certain period of time, or the RB sets where there is absence of other RAT).

Figure 8F:
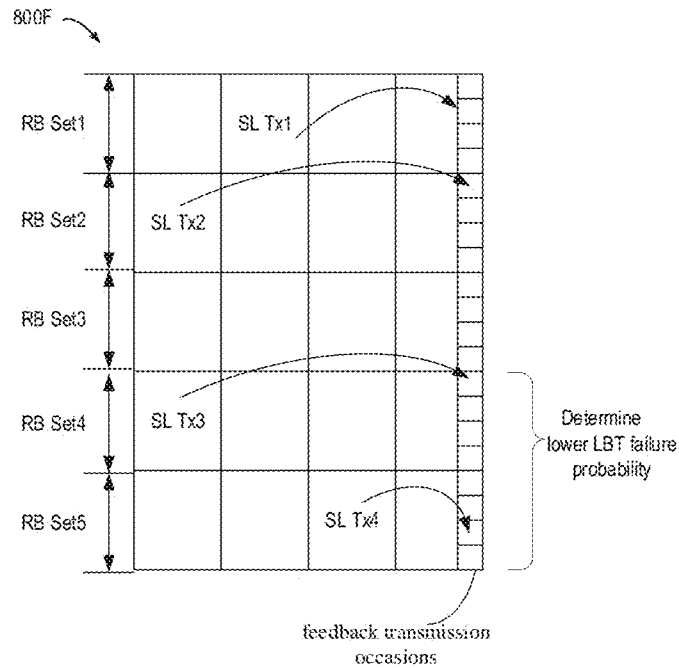

Reference is now made to FIG. 8F. In FIG. 8F, RB set 4 and/or RB set 5 is determined to be with lower LBT failure probabilities, such as, there is on other RAT(s) transmission performed on RB set 4 and/or RB set 5. Thus, group of {RB set 4, RB set 5} is determined.

In some example embodiments, the cast type of the SL transmissions is one of the following: a unicast or a groupcast.

In some example embodiments, the apparatus 610 may selects the PSFCHs in the contiguous RB sets following a (pre) configured/predefined order of cast type priority, e.g., prioritizing unicast over groupcast (ACK/NACK or NACK-only) or vice-versa.

Figure 8G:
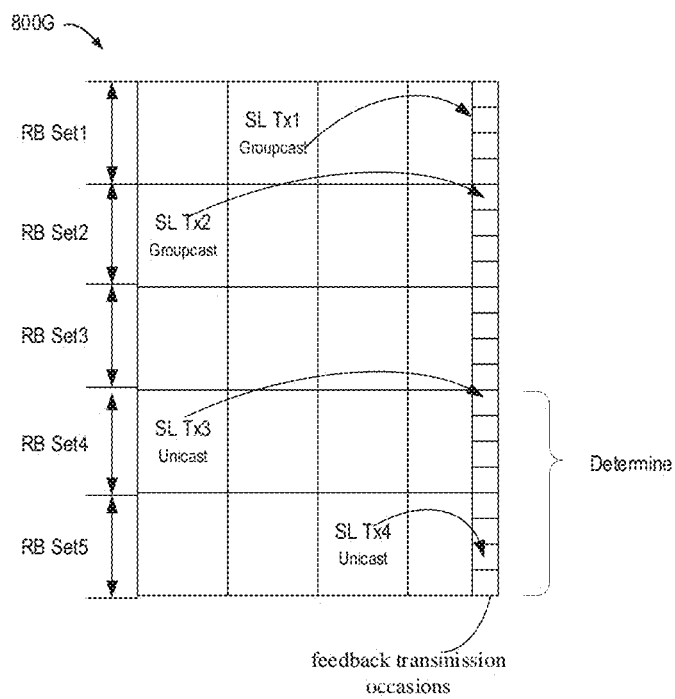

Reference is now made to FIG. 8G. In FIG. 8G, SL Tx1 and SL Tx2 are groupcast SL transmissions, while SL Tx 3 and SL tx4 are unicast SL transmissions. In case that the unicast type is prioritized, group of {RB set 4, RB set 5} is determined. Accordingly, in case that the groupcast type is prioritized, group of {RB set 1, RB set 2} is determined.

In some example embodiments, the apparatus 610 may perform LBT procedures on at least the non-contiguous resource sets, and determine the at least one resource set further based on LBT monitoring results of the LBT procedures.

In some example embodiments, the apparatus 610 may perform LBT in all configured RB sets and select the PSFCHs which are located in the contiguous RB sets which succeed LBT. The other rules can be used in addition for down selecting to one of the contiguous RB sets groups.

Figure 8H:
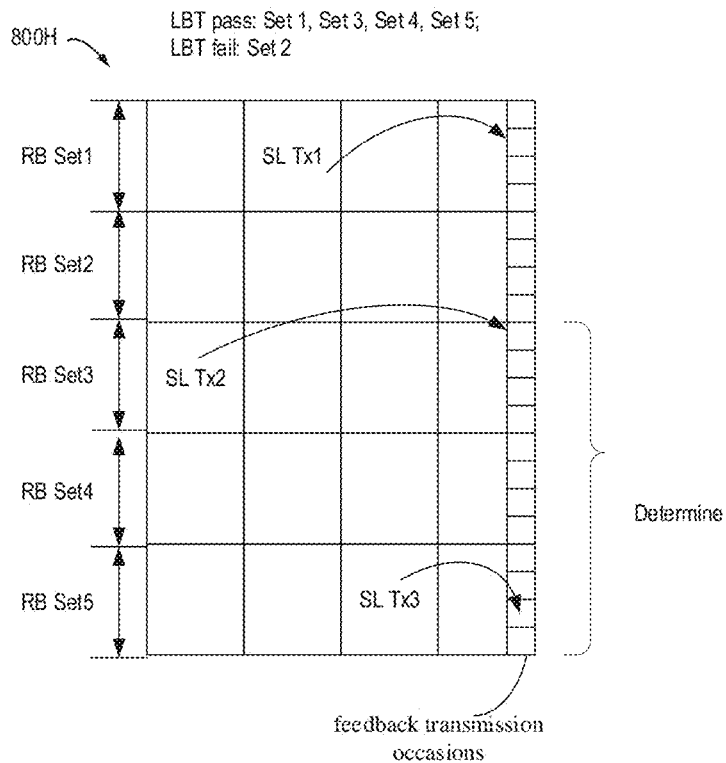

Reference is now made to FIG. 8H. In FIG. 8H, the LBT procedures on RB sets 1, 3, 4, 5 are successful and the LBT procedures on RB set 2 is failed. Thus, group of {RB set 3, RB set 4, RB set 5} is determined.

As discussed above, in some example embodiments, the apparatus 610 may determine the groups of contiguous resource sets based on a receive power strength of a sidelink transmission associated with feedback information carried on a resource set of the non-contiguous resource sets.

In some example embodiments, the apparatus 610 may selects the PSFCHs in the contiguous RB sets which maximize the average reference signal received power (RSRP) associated to the transmissions on each RB set. In the following example, the average power of the received PSSCH/PSSCH in contiguous RB set 1 and 2 is greater than the average power in the contiguous RB set 4 and 5. Here the apparatus 610 could prioritize the PSFCH transmission for TX1, TX2 over contiguous RB set 1 and 2, since the higher transmission power ensures the better channel condition, small Tx-Rx UE distance, and hence better probability of success of PSFCH reception at the TX UE.

In addition to RSRP, other metrics which allow the Rx UE to estimate how well its feedback signals will be received by the Tx UEs can be used (e.g., in case the RX UE knows that a TX UE which has transmitted in a certain RB set will not be receiving the associated feedback based on IUC, it may down prioritize the associated PSFCH in the decision for determining the contiguous RB sets).

In summary, the RSRP is used as an example of receive power strength for describing some specific example embodiments of the present disclosure. The example embodiments described with regard to the RSRP may be equally applicable to other type of receive power strength, including but not limited to signal to interference and noise ratio (SINR), received signal strength indicator (RSSI), reference signal received quality (RSRQ), and so on. The present disclosure is not limited in this regard.

Figure 8I:
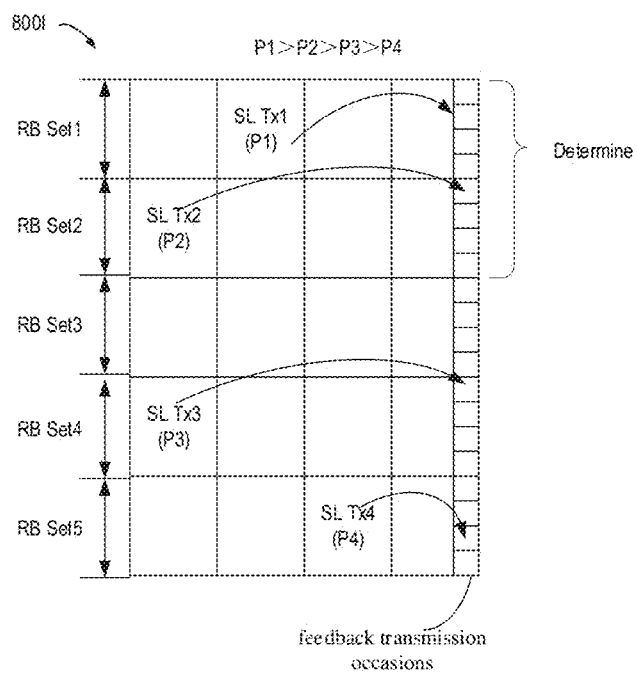

Reference is now made to FIG. 8I. In FIG. 8I, the receive power strengths of RB sets 1, 2, 4, 5 are represented as P1, P2, P3 and P4, where P1>P2>P3>P4. Thus, group of {RB set 1, RB set 2} is determined.

Additionally, in some embodiments, the apparatus 620 (i.e., feedback information receiver) always monitor feedback information on the configured feedback transmission occasion.

Alternatively, the apparatus 620 may apply a same rule(s) and logic to determine the group of contiguous resource sets. With this determination, the apparatus 620 may be determined whether it needs to monitor related feedback information. Merely for brevity, the same or similar contents are omitted here.

Example Methods

Figure 9:
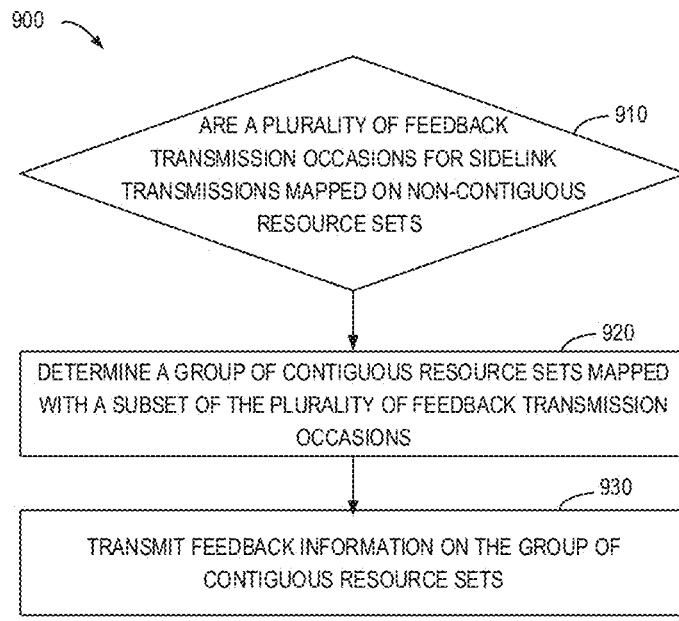
FIG. 9 illustrates a flowchart of a method implemented at a first device according to some example embodiments of the present disclosure.

FIG. 9 shows a flowchart of an example method 900 implemented at a first device in accordance with some example embodiments of the present disclosure. For the purpose of discussion, the method 900 will be described from the perspective of the apparatus 610 in FIG. 6A.

At block 910, the apparatus determines whether the plurality of feedback transmission occasions for sidelink transmissions are mapped on non-contiguous resource sets.

At block 920, in accordance with a determination that a plurality of feedback transmission occasions for sidelink transmissions are mapped on non-contiguous resource sets, the apparatus determines a group of contiguous resource sets mapped with a subset of the plurality of feedback transmission occasions.

At block 930, the apparatus transmits feedback information on the group of contiguous resource sets.

In some example embodiments, the apparatus may prevent transmitting feedback information on one or more feedback transmission occasions which are not mapped on the group of contiguous resource sets.

In some example embodiments, the apparatus may deprioritize transmitting feedback information on one or more feedback transmission occasions which are not mapped on the group of contiguous resource sets.

In some example embodiments, the apparatus may determine the group of contiguous resource sets based on one or more rules associated with at least one of the following: the amount of feedback information carried on a resource set of the non-contiguous resource sets, priority information of a sidelink transmission associated with feedback information carried on a resource set of the non-contiguous resource sets, priority information of a resource set of the non-contiguous resource sets, a feedback-type of feedback occasion of the plurality of feedback transmission occasions, a cast-type of feedback information carried on a resource set of the non-contiguous resource sets, listening before talk (LBT)-related information on the non-contiguous resource sets, or a receive power strength of a sidelink transmission associated with feedback information carried on a resource set of the non-contiguous resource sets.

In some example embodiments, the apparatus may determine, based on the amount of feedback information, the group of contiguous resource sets so that it maximizes the amount of feedback information transmitted by using contiguous resource sets.

In some example embodiments, the feedback-type of feedback occasion is one of the following: a primary feedback transmission occasion of feedback information, or a secondary feedback transmission occasion of feedback information.

In some example embodiments, the primary feedback transmission occasion and the secondary feedback transmission occasion are mapped on two different resource sets in a same slot, the apparatus may transmit feedback information on a target feedback occasion, wherein the target feedback occasion is the primary feedback transmission occasion or the secondary feedback transmission occasion and wherein the target feedback occasion is mapped on the group of contiguous resource sets.

In some example embodiments, the primary feedback transmission occasion and the secondary feedback transmission occasion are mapped on two different slots, in accordance with a determination of a transmission failure of feedback information on the primary feedback transmission occasion, the apparatus may determine the group of contiguous resource sets to comprise a resource set with the mapping of the secondary feedback transmission occasion.

In some example embodiments, the feedback-type of feedback occasion is an indication for inter-UE coordination (IUC). The apparatus may select the group of contiguous RB sets which includes IUC indication.

In some example embodiments, the apparatus may determine, based on the LBT-related information, the group of contiguous resource sets which has a lower LBT failure probability.

In some example embodiments, the apparatus may determine an LBT failure probability of the resource set is lower in response to at least one of the following: the resource set being associated with an initiated channel occupancy time (COT), the resource set being associated with a Type 2C LBT, a duration without LBT failure exceeding or equaling to a threshold duration, the resource set being not used by other radio access technology (RAT).

In some example embodiments, the cast type of the SL transmissions is one of the following: a unicast or a groupcast.

In some example embodiments, the apparatus may perform LBT procedures on at least the non-contiguous resource sets; and determine the at least one resource set further based on LBT monitoring results of the LBT procedures.

In some example embodiments, the apparatus may determine, by sequentially applying the one or more rules, the group of contiguous resource sets according to a rule order.

In some example embodiments, the sidelink transmissions are received on unlicensed resources.

Example Apparatus, Device and Medium

In some example embodiments, a first apparatus capable of performing any of the method 900 (for example, the apparatus 610 may in FIG. 6A) may comprise means for performing the respective operations of the method 900. The means may be implemented in any suitable form. For example, the means may be implemented in a circuitry or software module. The first apparatus may be implemented as or included in the apparatus 610 may in FIG. 6A.

In some example embodiments, the apparatus comprises means for in accordance with a determination that a plurality of feedback transmission occasions for sidelink transmissions are mapped on non-contiguous resource sets, determining a group of contiguous resource sets mapped with a subset of the plurality of feedback transmission occasions; and means for transmitting feedback information on the group of contiguous resource sets.

In some example embodiments, the apparatus further comprises: means for preventing transmitting feedback information on one or more feedback transmission occasions which are not mapped on the group of contiguous resource sets.

In some example embodiments, the apparatus further comprises: means for deprioritizing transmitting feedback information on one or more feedback transmission occasions which are not mapped on the group of contiguous resource sets.

In some example embodiments, the apparatus further comprises: means for determining the group of contiguous resource sets based on one or more rules associated with at least one of the following: the amount of feedback information carried on a resource set of the non-contiguous resource sets, means for priority information of a sidelink transmission associated with feedback information carried on a resource set of the non-contiguous resource sets, means for priority information of a resource set of the non-contiguous resource sets, a feedback-type of feedback occasion of the plurality of feedback transmission occasions, a cast-type of feedback information carried on a resource set of the non-contiguous resource sets, means for listening before talk (LBT)-related information on the non-contiguous resource sets, or a receive power strength of a sidelink transmission associated with feedback information carried on a resource set of the non-contiguous resource sets.

In some example embodiments, the apparatus further comprises: means for determining, based on the amount of feedback information, the group of contiguous resource sets so that it maximizes the amount of feedback information transmitted by using contiguous resource sets.

In some example embodiments, the feedback-type of feedback occasion is one of the following: a primary feedback transmission occasion of feedback information, or a secondary feedback transmission occasion of feedback information. In some example embodiments, the primary feedback transmission occasion and the secondary feedback transmission occasion are mapped on two different resource sets in a same slot, and the apparatus further comprises:

means for transmitting feedback information on a target feedback occasion, wherein the target feedback occasion is the primary feedback transmission occasion or the secondary feedback transmission occasion and wherein the target feedback occasion is mapped on the group of contiguous resource sets.

In some example embodiments, the primary feedback transmission occasion and the secondary feedback transmission occasion are mapped on two different slots, and the apparatus further comprises: means for in accordance with a determination of a transmission failure of feedback information on the primary feedback transmission occasion, determining the group of contiguous resource sets to comprise a resource set with the mapping of the secondary feedback transmission occasion.

In some example embodiments, the feedback-type of feedback occasion is an indication for inter-UE coordination (IUC). The apparatus may select the group of contiguous RB sets which includes IUC indication.

In some example embodiments, the apparatus further comprises: means for determining, based on the LBT-related information, the group of contiguous resource sets which has a lower LBT failure probability.

In some example embodiments, the apparatus further comprises: means for determining an LBT failure probability of the resource set is lower in response to at least one of the following: the resource set being associated with an initiated channel occupancy time (COT), the resource set being associated with a Type 2C LBT, a duration without LBT failure exceeding or equaling to a threshold duration, the resource set being not used by other radio access technology (RAT).

In some example embodiments, the cast type of the SL transmissions is one of the following: a unicast or a groupcast.

In some example embodiments, the apparatus further comprises: means for performing LBT procedures on at least the non-contiguous resource sets; and means for determining the at least one resource set further based on LBT monitoring results of the LBT procedures.

In some example embodiments, the apparatus further comprises: means for determining, by sequentially applying the one or more rules, the group of contiguous resource sets according to a rule order.

In some example embodiments, the sidelink transmissions are received on unlicensed resources.

In some example embodiments, the apparatus further comprises means for performing other operations in some example embodiments of the method 900 or the apparatus 610. In some example embodiments, the means comprises at least one processor; and at least one memory storing instructions that, when executed by the at least one processor, cause the performance of the first apparatus.

Figure 10:
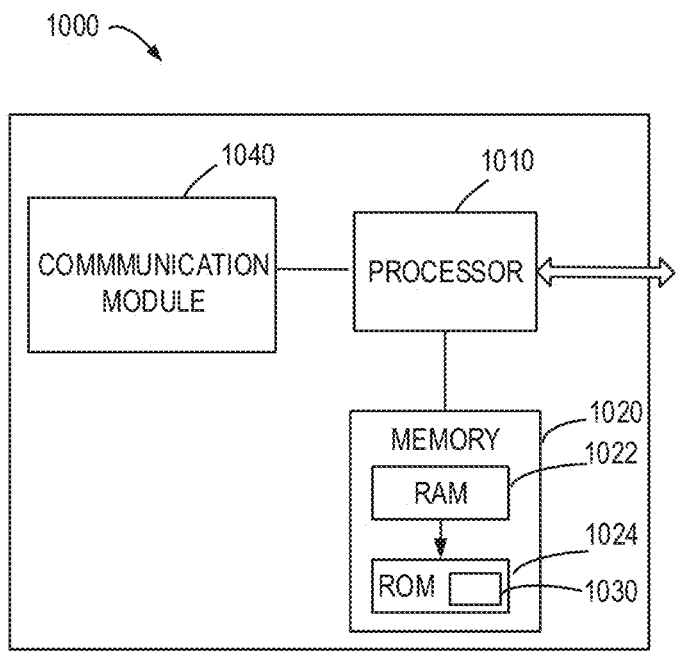
FIG. 10 illustrates a simplified block diagram of a device that is suitable for implementing example embodiments of the present disclosure.

FIG. 10 is a simplified block diagram of a device 1000 that is suitable for implementing example embodiments of the present disclosure. The device 1000 may be provided to implement a communication device, for example, the apparatus 610 in FIG. 6A. As shown, the device 1000 includes one or more processors 1010, one or more memories 1020 coupled to the processor 1010, and one or more communication modules 1040 coupled to the processor 1010.

The communication module 1040 is for bidirectional communications. The communication module 1040 has one or more communication interfaces to facilitate communication with one or more other modules or devices. The communication interfaces may represent any interface that is necessary for communication with other network elements.

In some example embodiments, the communication module 1040 may include at least one antenna.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The instructions of the program 1030 may include instructions for performing operations/acts of some example embodiments of the present disclosure. The program 1030 may be stored in the memory, e.g., the ROM 1024. The processor 1010 may perform any suitable actions and processing by loading the program 1030 into the RAM 1022.

The example embodiments of the present disclosure may be implemented by means of the program 1030 so that the device 1000 may perform any process of the disclosure as discussed with reference to FIG. 7 to FIG. 9. The example embodiments of the present disclosure may also be implemented by hardware or by a combination of software and hardware.

In some example embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 11:
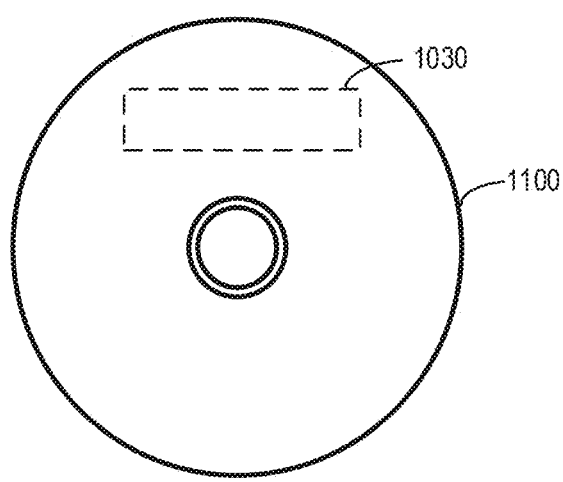
FIG. 11 illustrates a block diagram of an example computer readable medium in accordance with some example embodiments of the present disclosure.

FIG. 11 shows an example of the computer readable medium 1100 which may be in form of CD, DVD or other optical storage disk. The computer readable medium 1100 has the program 1030 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A apparatus comprising:
   at least one processor; and
   at least one memory storing instructions that, when executed by the at least one processor, cause the apparatus at least to:
   in accordance with a determination that a plurality of feedback transmission occasions for sidelink transmissions are mapped on non-contiguous resource sets, determine a group of contiguous resource sets mapped with a subset of the plurality of feedback transmission occasions; and
   transmit feedback information on the group of contiguous resource sets.

2. The apparatus of claim 1, wherein the apparatus is not able to transmit physical sidelink feedback channel, PSFCH, in non-contiguous resource sets.

3. The apparatus of claim 1, wherein the at least one memory and the at least one processor further cause the apparatus to:
   prevent transmitting feedback information on one or more feedback transmission occasions which are not mapped on the group of contiguous resource sets.

4. The apparatus of claim 1, wherein the at least one memory and the at least one processor further cause the apparatus to:
   deprioritize transmitting feedback information on one or more feedback transmission occasions which are not mapped on the group of contiguous resource sets.

5. The apparatus of claim 1, wherein the at least one memory and the at least one processor further cause the apparatus to:
   select physical sidelink feedback channels, PSFCH, in the contiguous resource sets which maximize a function of priority values associated to the PSFCH.

6. The apparatus of claim 1, wherein the at least one memory and the at least one processor further cause the apparatus to:
   determine the group of contiguous resource sets based on one or more rules associated with at least one of the following:
   priority information of a sidelink transmission associated with feedback information carried on a resource set,
   priority information of a resource set.

7. The apparatus of claim 1, wherein the at least one memory and the at least one processor further cause the apparatus to:
   determine the group of contiguous resource sets based on one or more rules associated with at least one of the following:
   the amount of feedback information carried on a resource set of the non-contiguous resource sets,
   priority information of a sidelink transmission associated with feedback information carried on a resource set of the non-contiguous resource sets,
   priority information of a resource set of the non-contiguous resource sets, a feedback-type of feedback occasion of the plurality of feedback transmission occasions, a cast-type of feedback information carried on a resource set of the non-contiguous resource sets, listen before talk (LBT)-related information on the non-contiguous resource sets, or a receive power strength of a sidelink transmission associated with feedback information carried on a resource set of the non-contiguous resource sets.

8. The apparatus of claim 7, wherein the at least one memory and the at least one processor further cause the apparatus to:

determine, based on the amount of feedback information, the group of contiguous resource sets so that it maximizes the amount of feedback information transmitted by using contiguous resource sets.

9. The apparatus of claim 7, wherein the feedback-type of feedback occasion is one of the following:

a primary feedback transmission occasion of feedback information, or a secondary feedback transmission occasion of feedback information.

10. The apparatus of claim 9, wherein the primary feedback transmission occasion and the secondary feedback transmission occasion are mapped on two different resource sets in a same slot, and wherein the at least one memory and the at least one processor further cause the apparatus to:

transmit feedback information on a target feedback occasion, wherein the target feedback occasion is the primary feedback transmission occasion or the secondary feedback transmission occasion and wherein the target feedback occasion is mapped on the group of contiguous resource sets.

11. The apparatus of claim 9, wherein the primary feedback transmission occasion and the secondary feedback transmission occasion are mapped on two different slots, and wherein the at least one memory and the at least one processor further cause the apparatus to:

in accordance with a determination of a transmission failure of feedback information on the primary feedback transmission occasion, determine the group of contiguous resource sets to comprise a resource set with the mapping of the secondary feedback transmission occasion.

12. The apparatus of claim 7, wherein the at least one memory and the at least one processor further cause the apparatus to:

determine, based on the LBT-related information, the group of contiguous resource sets which has a lower LBT failure probability.

13. The apparatus of claim 12, wherein the at least one memory and the at least one processor further cause the apparatus to:

determine an LBT failure probability of the resource set is lower in response to at least one of the following:

the resource set being associated with an initiated channel occupancy time (COT), the resource set being associated with a Type 2C LBT, a duration without LBT failure exceeding or equaling to a threshold duration, the resource set being not used by other radio access technology (RAT).

14. The apparatus of claim 7, wherein the cast type of the SL transmissions is one of the following: a unicast or a groupcast.

15. The apparatus of claim 7, wherein the at least one memory and the at least one processor further cause the apparatus to:

perform LBT procedures on at least the non-contiguous resource sets; and determine the at least one resource set further based on LBT monitoring results of the LBT procedures.

16. The apparatus of claim 7, wherein the at least one memory and the at least one processor further cause the apparatus to:

determine, by sequentially applying the one or more rules, the group of contiguous resource sets according to a rule order.

17. The apparatus of claim 1, wherein the sidelink transmissions are received on unlicensed resources.

18. The apparatus of claim 1, wherein the apparatus is a terminal device or is comprised in a terminal device.

19. A method for an apparatus comprising:

in accordance with a determination that a plurality of feedback transmission occasions for sidelink transmissions are mapped on non-contiguous resource sets, determining a group of contiguous resource sets mapped with a subset of the plurality of feedback transmission occasions; and transmitting feedback information on the group of contiguous resource sets.

20. A non-transitory computer readable medium comprising instructions stored thereon for causing an apparatus at least to perform the method of claim 19.

* * * * *